United States Patent
Majima et al.

(10) Patent No.: US 7,081,613 B1
(45) Date of Patent: Jul. 25, 2006

(54) RETROREFLECTIVE PHOTOELECTRIC SENSOR

(75) Inventors: Yoshikazu Majima, Fukuchiyama (JP); Yukinori Kurumado, Ogaki (JP); Arata Nakamura, Mishima-gun (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 11/378,593

(22) Filed: Mar. 16, 2006

Related U.S. Application Data

(62) Division of application No. 10/731,526, filed on Dec. 8, 2003, now Pat. No. 7,045,766.

(30) Foreign Application Priority Data

Dec. 9, 2002  (JP) .............................. 2002-357263
Nov. 18, 2003 (JP) .............................. 2003-388499

(51) Int. Cl.
   *G02F 1/01*   (2006.01)
   *G02B 5/30*   (2006.01)
(52) U.S. Cl. ...................... 250/225; 250/216; 359/485; 369/112.16
(58) Field of Classification Search ................ 250/221, 250/222.1, 225, 216; 359/483–485, 489, 359/246, 281; 369/112.16, 112.17, 112.18
See application file for complete search history.

(56) References Cited

U.S. PATENT DOCUMENTS

| 5,574,595 | A | | 11/1996 | Kurata et al. |
| 5,687,153 | A | | 11/1997 | Komma et al. |
| 5,883,715 | A | * | 3/1999 | Steinlechner et al. ....... 356/487 |
| 2005/0041558 | A1 | * | 2/2005 | Yamamoto et al. .... 369/110.01 |

FOREIGN PATENT DOCUMENTS

JP          2001-41724       2/2001

* cited by examiner

*Primary Examiner*—Kevin Pyo
(74) *Attorney, Agent, or Firm*—Beyer Weaver & Thomas LLP

(57) ABSTRACT

A retroreflective photoelectric sensor has a light-emitting optical system having a light-emitting element and a first polarizer and serving to transmit light from the light-emitting element through the first polarizer, a light-receiving optical system having a second polarizer and a light-receiving element and serving to convert light received through the second polarizer into an electrical signal by the light-receiving element, the first and second polarizers having mutually perpendicular polarizer axes, a single lens for both emitting light from the light-emitting element and receiving light to the light-receiving element therethrough, a beam splitter serving to direct light received from the light-emitting optical system to the single lens and light received from the single lens to the light-receiving optical system, and a phase shifter inserted between the light-emitting optical system and the single lens.

6 Claims, 12 Drawing Sheets

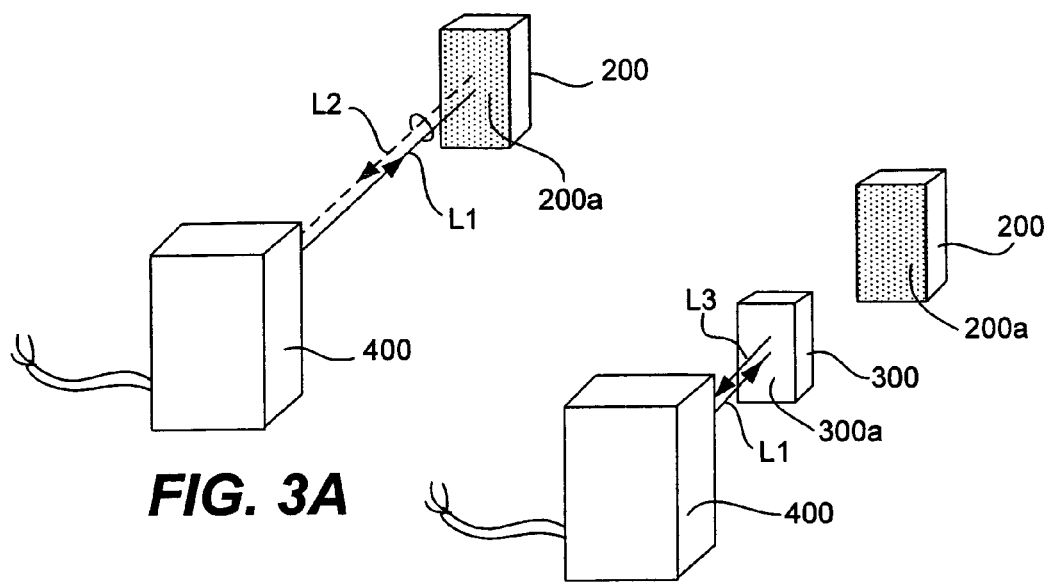
FIG. 3A
FIG. 3B
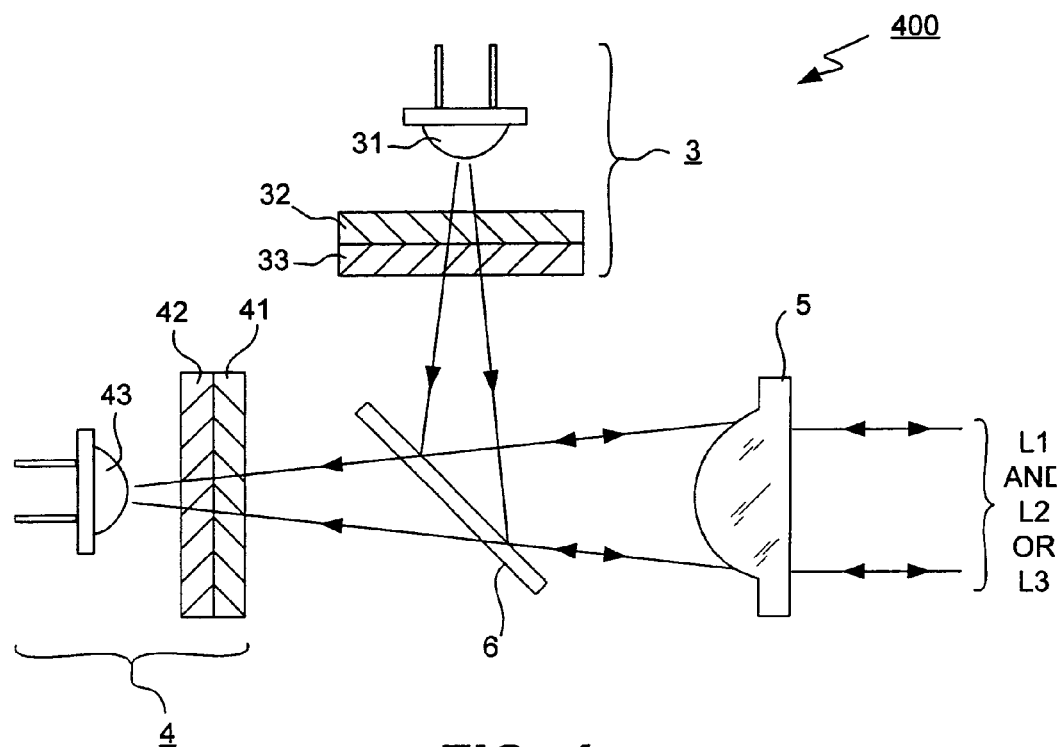
FIG. 4

RETROREFLECTIVE PHOTOELECTRIC SENSOR

This is a divisional of application Ser. No. 10/731,526 filed Dec. 8, 2003, now U.S. Pat. No. 7,045,766.

BACKGROUND OF THE INVENTION

This invention relates to a retroreflective photoelectric sensor which may be used with a reflector to together sandwich a target detection area for detecting a light-reflecting target object in the detection area.

A retroreflective photoelectric sensor is used generally with a reflector to together sandwich a target detection area therebetween and detects the presence or absence of a target object of detection based on the difference in the character of reflected light from the reflector and that from the target object of detection for light emitted from the sensor. In the case of a retroreflective photoelectric sensor for a target object, a reflector with a reflection characteristic that affects the polarization mode of the light emitted from the sensor is used, and the presence or absence of a target object of detection is determined on the basis of whether or not a polarization component peculiar to the reflected light from the reflector is contained in the light received from the target area of detection. For this purpose, it has been known to use reflectors of the type, for example, having many triangular pyramid-shaped indentations distributed on the reflective surface such that the incident light is reflected several times on the three surfaces around the top point of the pyramid shape to convert the polarization mode of the incident light which is initially linearly polarized and to return the reflected light back in the direction from which the incident light came.

The present inventors have earlier proposed a retroreflective photoelectric sensor of a so-called biaxial kind. For this sensor, a light-emitting lens and a light-receiving lens with small polarization distortion with retardation value less than 17 nm, made by injection-molding of a resin material, were used, and an optical system for the light emission was made by arranging a light-emitting element, a first polarizer (say, for vertical polarization) and the light-emitting lens in this order, another optical system for the light reception being made by arranging the light-receiving lens, a second polarizer (say, for horizontal polarization) and a light-receiving element, in this order.

Similarly, the present inventors also proposed (in Japanese Patent Publication Tokkai 2001-228260) a different retroreflective photoelectric sensor of a so-called coaxial kind, comprising a light-emitting optical system for emitting light from a light-emitting element by passing it through a first polarizer (say, for vertical polarization), a light-receiving optical system for receiving light through a second polarizer (say, for horizontal polarization) and converting the received light into an electrical signal by using a light-receiving element, a single common lens for both emitting light from the light-emitting element and receiving light to be received by the light-receiving element and a beam splitter placed between the light-emitting and light-receiving optical systems and the common lens for directing both the outgoing light from the light-emitting element to the common lens and the incoming light through the common lens to the light-receiving optical system.

A sensor with this structure is advantageous in that the first and second polarizers, which used to be placed in front of the respective lenses according to the earlier technology, are now placed behind the lens and they may be made smaller in size and hence that the sensor case and the lens can be integrally formed, thereby contributing to significantly reduce the production cost of the sensor.

With a sensor of this structure with both the first and second polarizers placed behind the lens, however, there was a problem of light leakage even if the two polarizers are set in the mutually perpendicular relationship (or the cross-nicol relationship, forming so-called crossed nicols) such that the quantity of received light in the presence of a light-reflecting target object could not be made sufficiently smaller than that in its absence.

SUMMARY OF THE INVENTION

It is therefore an object of this invention in view of the problem described above to provide a retroreflective photoelectric sensor which can be produced inexpensively and still has a reliable detection capability.

A retroreflective photoelectric sensor embodying this invention may be characterized as comprising a light-emitting optical system having a light-emitting element and a first polarizer and serving to transmit light from the light-emitting element through the first polarizer, a light-receiving optical system having a second polarizer and a light-receiving element and serving to convert light received through the second polarizer into an electrical signal by the light-receiving element, a single lens for both emitting light from the light-emitting element and receiving light to the light-receiving element therethrough, a beam splitter serving to direct light received from the light-emitting optical system to the single lens and light received from the single lens to the light-receiving optical system, and a phase shifter inserted between the light-emitting optical system and the single lens, and wherein the first polarizer and the second polarizer have mutually perpendicular polarizer axes.

In the above, the phase shifter may be inserted between the first polarizer and the beam splitter or between the beam splitter and the single lens. Another phase shifter may be inserted between the second polarizer and the beam splitter, each serving to shift the phase by $3/8$–$5/8$ with respect to the wavelength.

Another retroreflective photoelectric sensor according to this invention may be characterized as comprising a light-emitting optical system having a light-emitting element and a first polarizer and serving to transmit light from the light-emitting element through the first polarizer, a light-receiving optical system having a second polarizer and a light-receiving element and serving to convert light received through the second polarizer into an electrical signal by the light-receiving element, the first polarizer and the second polarizer having mutually perpendicular polarizer axes, a single lens for both emitting light from the light-emitting element and receiving light to the light-receiving element therethrough, a beam splitter serving to direct light received from the light-emitting optical system to the single lens and light received from the single lens to the light-receiving optical system, and means disposed between the first polarizer and the beam splitter for canceling the total rotation of the polarization plane that is the sum of rotations caused by passing through the first polarizer and the light-emitting lens.

BRIEF DESCRIPTION OF THE DRAWINGS

FIGS. 3A and 3B are schematic drawings for explaining the principle of a retroreflective photoelectric sensor of a coaxial type respectively when there is not and there is an object in the target area of detection.

FIG. 4 is a structural diagram of the optical system of a retroreflective photoelectric sensor of a coaxial type embodying this invention.

DETAILED DESCRIPTION OF THE INVENTION

The invention is described next by way of an example with reference to drawings but this example is merely one of many that embody the invention and hence is not intended to limit the scope of the invention.

Figure 1A:
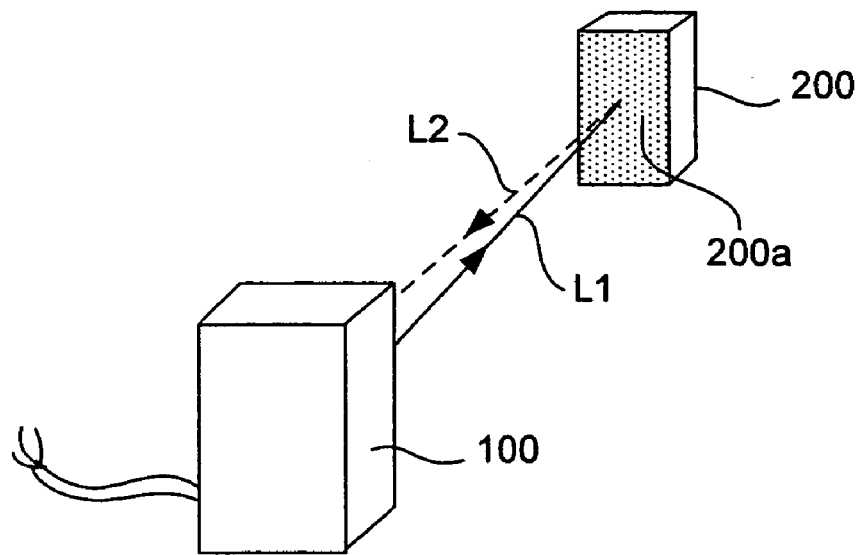
FIGS. 1A and 1B are schematic drawings for explaining the principle of a retroreflective photoelectric sensor of a biaxial type respectively when there is not and there is an object in the target area of detection.
Figure 1B:
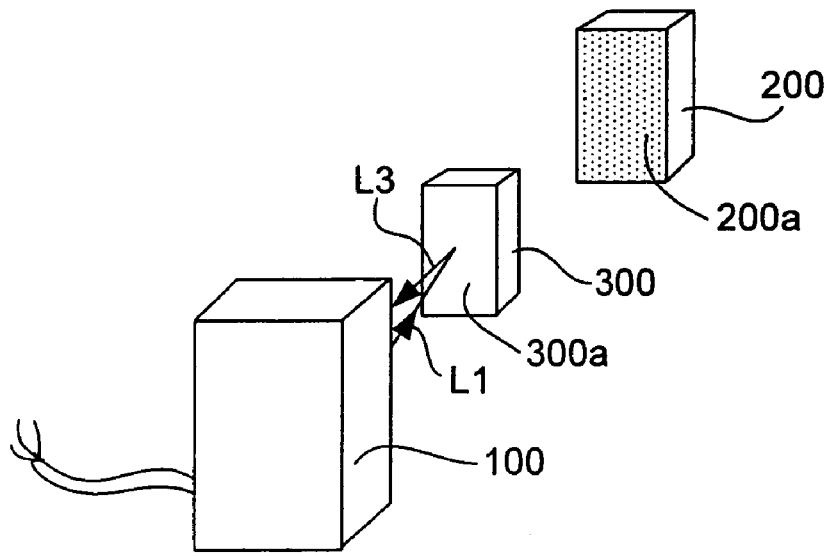

FIGS. 1A and 1B are schematic drawings for explaining the principle of a retroreflective photoelectric sensor 100 of a biaxial type respectively when there is not and there is an object in the target area of detection. In FIGS. 1A and 1B, symbol 200 indicates a reflector having a reflecting surface 200a, symbol 300 indicates a light-reflecting target object of detection with a reflecting surface 300a, symbol L1 indicates light emitted from the sensor 100, symbol L2 indicates reflected light from the reflector 200 and symbol L3 indicates reflected light from the target object 300.

As can be clearly understood from FIGS. 1A and 1B, the retroreflective sensor 100 is placed opposite the reflector 200 so as to sandwich therewith a target area of detection where the target object 300 is expected to pass. As explained above, the reflecting surface 200a of the reflector 200 is formed so as not only to reflect the emitted light L1 from the sensor 100 but also to change its polarization mode upon reflection. If the emitted light L1 from the sensor 100 is linearly polarized in the horizontal direction, for example, the reflected light L2 may be elliptically polarized including a vertical component.

If there is no object in the target area of detection, as shown in FIG. 1A, the emitted light L1 from the sensor 100 is reflected by the reflecting surface 200a of the reflector 200 and hence a sufficiently large quantity of reflected light L2 is received by the sensor 100. If the emitted light L1 from the sensor 100 is linearly polarized in the vertical direction, for example, the reflected light L2 is elliptically polarized including a horizontal component. Thus, the sensor 100 can determine the presence or absence of an object in the target area of detection on the basis of the determination whether or not a specified amount of horizontal component is included in the light received thereby from the target area of detection.

If there is a light-reflecting target object 300 in the target area of detection, as shown in FIG. 1B, the emitted light L1 from the sensor 100 is reflected by its reflecting surface 300a and hence a fairly large quantity of reflected light L3 is received by the sensor 100. Since the reflecting surface 300a of the target object 300 is not specifically structured to modify the polarization mode of the light L1 from the sensor 100 made incident thereupon, if the emitted light L1 from the sensor 100 is linearly polarized in the vertical direction, for example, the reflected light L3 from the target object 300 will also be linearly polarized in the vertical direction, having no horizontal component. Thus, the presence of an object in the target area of detection can be detected on the basis of the absence of horizontal component in the light received from the target area of detection.

Figure 2:
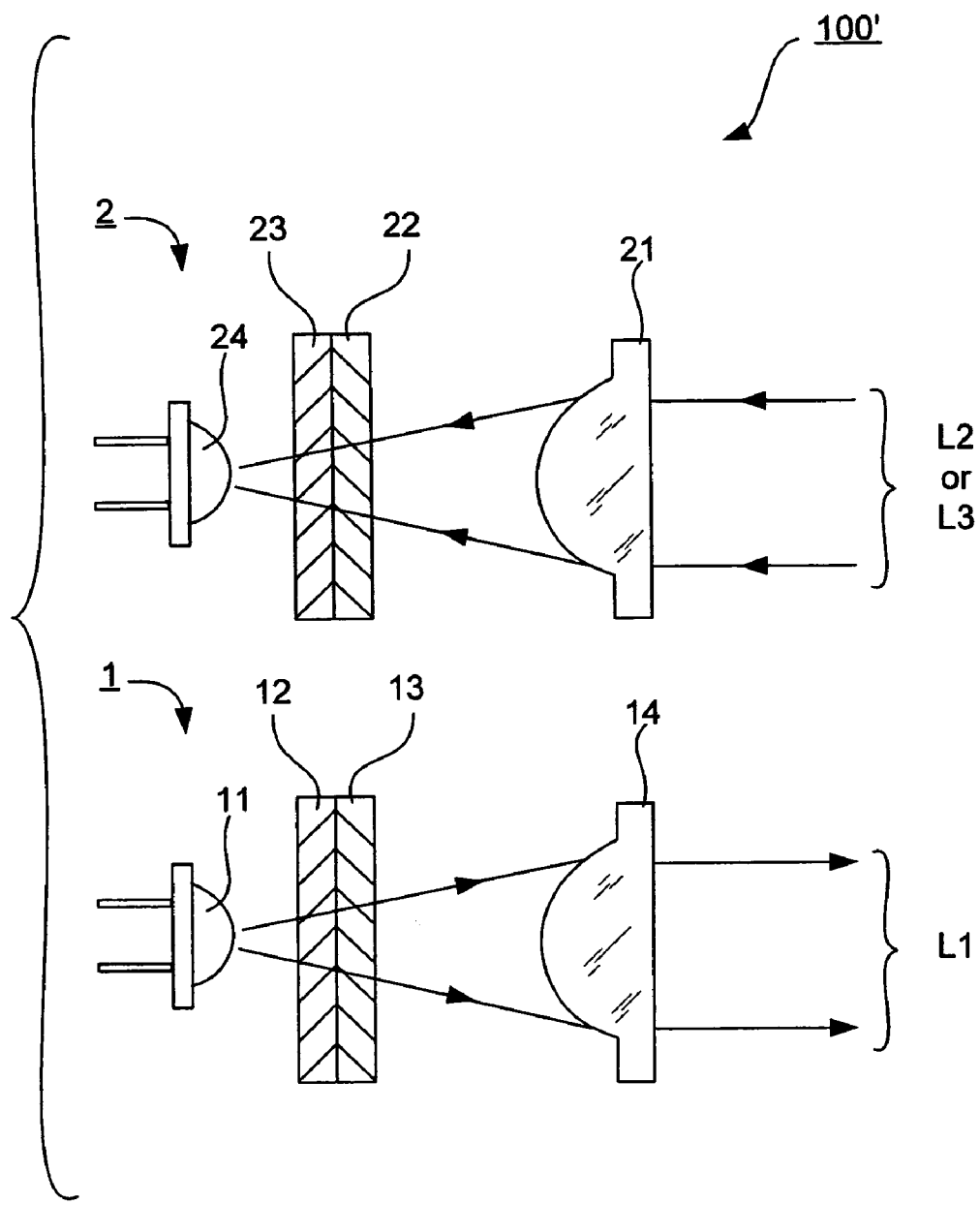
FIG. 2 is a structural diagram of the optical system of a retroreflective photoelectric sensor of a biaxial type embodying this invention.

As shown schematically in FIG. 2, the retroreflective photoelectric sensor 100' of a biaxial type embodying this invention comprises an optical system for emitting light (the light-emitting optical system 1) and another optical system for receiving light (the light-receiving optical system 2). The light-emitting optical system 1 has a light-emitting element 11, a first polarizer 12 and a light-emitting lens 14 arranged in this order, and the light-receiving optical system 2 has a light-receiving lens 21, a second polarizer 23 and a light-receiving element 24 in this order. The first and second polarizers 12 and 23 have their polarizer axes differently oriented. In the present invention, the polarization axis of the first polarizer 12 is vertical and that of the second polarizer 23 is horizontal. In other words, the first and second polarizers 12 and 23 in this example are in the so-called cross-nicol relationship.

In addition, a half-wave phase shifter (hereinafter referred to as the "½ phase shifter") 13 is disposed between the first polarizer 12 and the light-emitting lens 14 of the light-emitting optical system 1 and another ½ phase shifter 22 is disposed between the light-receiving lens 21 and the second polarizer 23 of the light-receiving optical system 2. Although FIG. 2 shows the first and second polarizers 12 and 23 in direct contact respectively with the associated one of the ½ phase shifters 13 and 22, this is not intended to limit the scope of the invention. They may be arranged so as to be mutually separated with appropriate intervals therebetween. It is preferable to use a material with a small index of refraction for the light-emitting and light-receiving lenses 14 and 21. Plastic lenses with little double refraction and glass lenses may be utilized.

The emitted light from the light-emitting element 11 passes through the first polarizer 12 and the ½ phase shifter 13 while enlarging the sectional area of its flux at a fixed rate and is made incidence on the light-emitting lens 14, propagating thereafter as the emitted light L1 to the target area of detection. Reflected light L2 or L3 from the target area of detection is passed through the light-receiving lens 21 and thereafter through the ½ phase shifter 22 and the second polarizer 23 while reducing the sectional area of its flux at a fixed rate, being received by the light receiving element 24 and converted thereby into an electrical signal. Since the first and second polarizers 12 and 23 are in the cross-nicol relationship, the presence or absence of an object in the target area of detection can be determined as explained above with reference to FIG. 1.

Since the ½ phase shifters 13 and 22 are inserted according to this invention respectively between the first polarizer 12 and the light-emitting lens 14 and between the light-receiving lens 21 and the second polarizer 23, leakage of light can be minimized when there is a light-reflecting target object in the target area of detection such that there will be a sufficiently large difference in the quantity of received light between when there is and is not a target object in the target area of detection. This will be explained more in detail below with reference to FIGS. 5–11.

The present invention includes retroreflective photoelectric sensors of the so-called coaxial type. FIGS. 3A and 3B are schematic drawings for explaining the principle of a retroreflective photoelectric sensor 400 of the coaxial type respectively when there is not and there is an object in the target area of detection. In FIGS. 3A and 3B, as in FIGS. 1A and 1B explained above, symbol 200 indicates a reflector having a reflecting surface 200a, symbol 300 indicates a target object with a reflecting surface 300a, symbol L1 indicates light emitted from the sensor 100, symbol L2 indicates reflected light from the reflector 200 and symbol L3 indicates reflected light from the target object 300.

The principles of operation are essentially the same as for a sensor of the biaxial type. If there is no object in the target area of detection as shown in FIG. 3A, the sensor 400 receives reflected light L2 from the reflector 200 but if there is a target object 300 in the target area of detection as shown in FIG. 3B, the sensor 400 receives reflected light L3 from the target object 300. The difference is that the reflected light L2 and L3 and the emitted light L1 have the same optical axis.

As shown schematically in FIG. 4, the retroreflective photoelectric sensor 400 of the coaxial type embodying this invention comprises an optical system for emitting light (the light-emitting optical system 3) and another optical system for receiving light (the light-receiving optical system 4). The light-emitting optical system 3 serves to output the light from a light-emitting element 31 through a first polarizer 32, and the light-receiving optical system 4 serves to convert received light polarized by a second polarizer 42 into an electrical signal by a light-receiving element 43. The sensor 400 further comprises a single lens (the "common lens 5") used for passing both emitted and received light and a beam splitter 6 disposed between the common lens 5 and the light-emitting and light-receiving optical systems 3 and 4 for directing the outgoing light emitted from the light-emitting optical system 3 to the common lens 5 and the incoming light received through the common lens 5 to the light-receiving optical system 4.

The polarization directions (or the directions of the polarizer axes) of the first and second polarizers 32 and 42 respectively of the light-emitting and light-receiving optical systems 3 and 4 are different. In the present example being described, the polarizer axis of the first polarizer 32 is perpendicular to the plane defined by the light-emitting element and the common lens 5, and the polarizer axis of the second polarizer is horizontal.

In addition to the above, a ½ phase shifter 33 is disposed between the first polarizer 32 of the light-emitting optical system 3 and the beam splitter 6 and another ½ phase shifter 41 is disposed between the second polarizer 42 of the light-receiving system 4 and the beam splitter 6. It is preferable to use a material with a small index of refraction also for the common lens 5. A plastic lens with little double refraction or a glass lenses may be utilized.

The emitted light from the light-emitting element 31 passes through the first polarizer 32 and the ½ phase shifter 33 while enlarging the sectional area of its flux at a fixed rate and is made incidence to the common lens 5, propagating thereafter as the emitted light L1 to the target area of detection. Reflected light L2 or L3 from the target area of detection is passed through the common lens 5 and thereafter sequentially through the ½ phase shifter 41 and the second polarizer 42 while reducing the sectional area of its flux at a fixed rate, being received by the light receiving element 43 and converted thereby into an electrical signal according to the quantity of the received light. Since the first and second polarizers 32 and 42 are in the cross-nicol relationship, the presence or absence of an object in the target area of detection can be determined as explained above with reference to FIG. 3.

Since the ½ phase shifters 33 and 41 are inserted according to this invention respectively between the first polarizer 32 and the beam splitter 6 and between the beam splitter 6 and the second polarizer 42, the difference in the quantity of received light can be made significantly large between when there is and is not a light-reflecting target object in the target area of detection. This, too, will be explained more in detail below with reference to FIGS. 5–11.

Figure 5A:
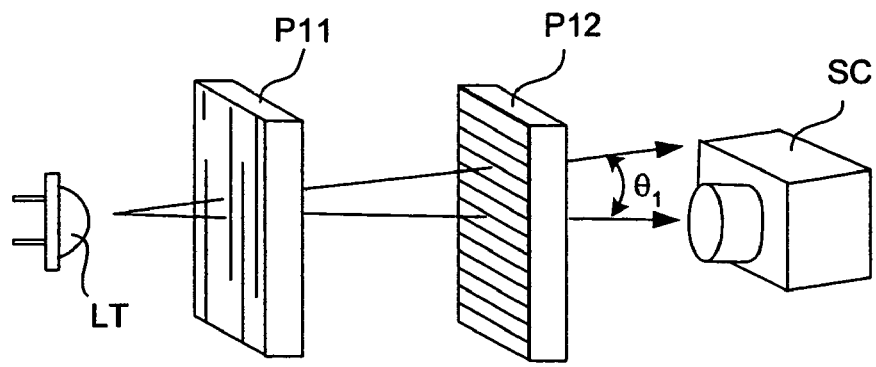
FIG. 5, consisting of FIGS. 5A, 5B and 5C, includes drawings for explaining the change in the direction of polarization of light by a polarizer.
Figure 5B:
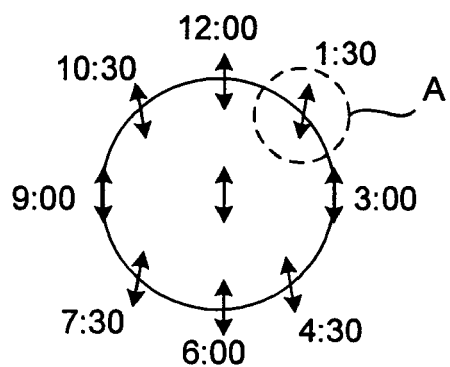
Figure 5C:
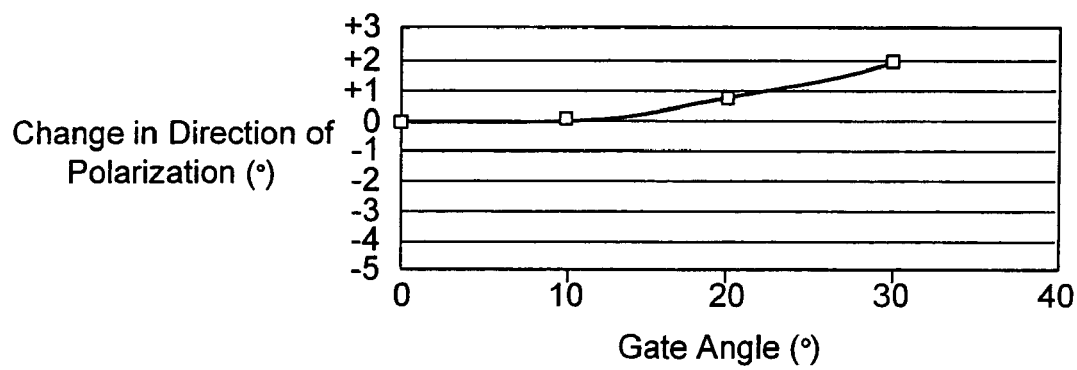

FIGS. 5A, 5B and 5C explain the local rotation of the plane of polarization (or the direction of polarization) by a polarizer. The present inventors set a light-emitting element LT and a stationary camera SC opposite each other and a first polarizer P11 and a second polarizer P12 in a cross-nicol relationship on the optical path between the light-emitting element LT and the stationary camera SC, as shown in FIG. 5A. The image thus taken by the camera SC clearly showed the presence of light leakage at four places corresponding to the four corners of a square. It is believed because the light from the light-emitting element LT propagates with its sectional area increasing and hence does not pass through the polarizers P11 and P12 perpendicularly thereto if its "gate angle" θ1 (defined, as shown in FIG. 5A, as the angle between the optical axis of the beam and the beam under consideration off the optical axis) is large.

Let us assume that the direction of polarization (or the polarizer axis) of the first polarizer P1 is vertical and that of the second polarizer P2 is horizontal. FIG. 5B shows the directions of polarization of different portions of the emitted light from the light-emitting element LT, the center of the circle indicating the beam of light heading perpendicularly to the first polarizer P11. The beams heading upward, to the right, downward and to the left are respectively represented at positions of 12 o'clock, 3 o'clock, 6 o'clock and 9 o'clock. As shown in FIG. 5B, the vertical direction of polarization of the emitted beam from the light-emitting element LT does not change for beams propagation straight as well as those propagating in the directions corresponding to 12 o'clock, 3 o'clock, 6 o'clock and 9 o'clock. For beams in the directions in between (each making an angle of 45° with the polarizer axis) corresponding to 1 o'clock and 30 minutes, 4 o'clock and 30 minutes, 7 o'clock and 30 minutes and 10 o'clock and 30 minutes, however, there is a change in the direction of polarization. This change increases as the gate angle increases, as shown in FIG. 5C, causing the light leakage as explained above.

The graph of FIG. 5C shows the relationship between the gate angle and the angle of polarization at the position of 1 o'clock 30 minutes (Position A indicated in FIG. 5B). This graph shows that the direction of polarization hardly changes if the gate angle is less than 10° but changes rapidly if the gate angle exceeds 10° and that the change in the polarization direction is about 2° when the gate angle is 30°.

Thus, if two polarizers P11 and P12 are placed in front of the light-emitting element LT and light therefrom is caused to pass through these polarizers P11 and P12, the beams separated from the optical axis of the emitted light pass through the polarizers obliquely and the polarization direction changes significantly for such beams. This is how leakage of light results.

Figure 6A:
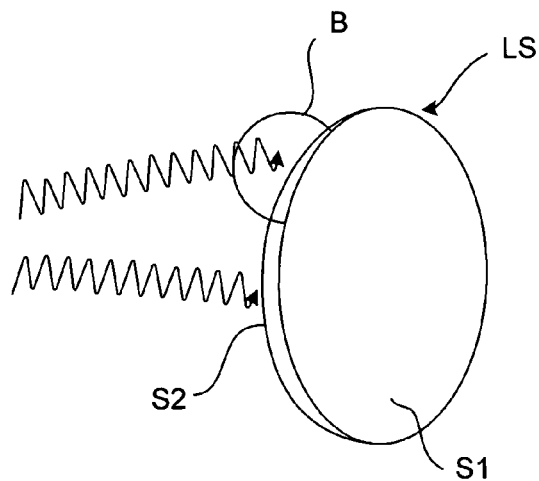
FIG. 6, consisting of FIGS. 6A, 6B and 6C, includes drawings for explaining the change in the direction of polarization of light by a lens.
Figure 6B:
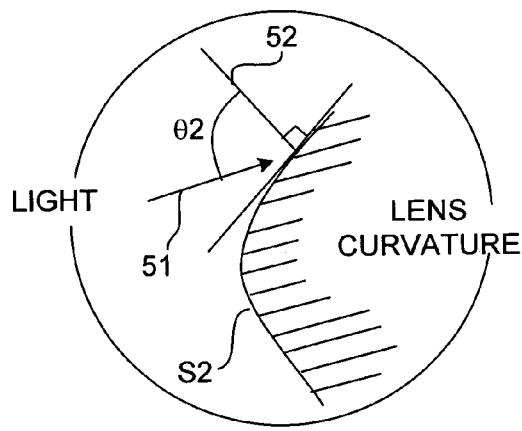
Figure 6C:
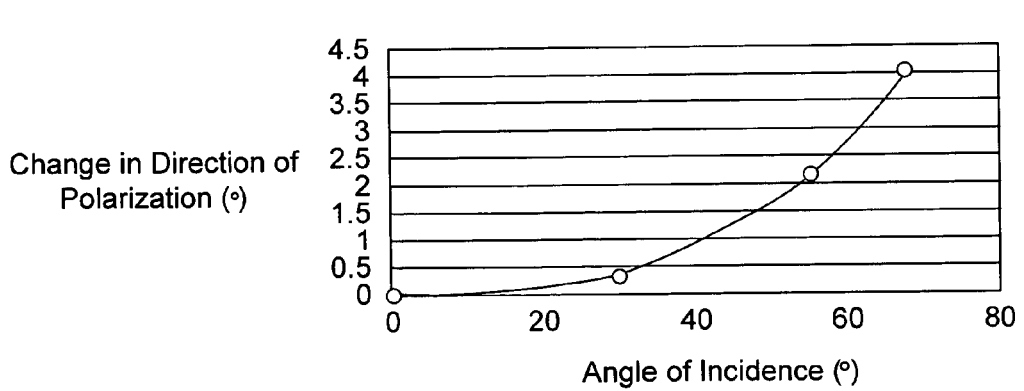

FIGS. 6A, 6B and 6C explain the local rotation of the plane of polarization by a lens. Let us consider a situation where a linearly polarized beam of light is passed through a plano-convex lens LS (having a flat surface S1 and a convex surface S2) from the side of its convex surface S2, as shown in FIG. 6A. If the direction of an incident light beam is indicated by symbol 51 and the normal line at the point of incidence is indicated by symbol 52, the angle of incidence θ2 for this beam is the angle between these two directions 51 and 52. This shows clearly that the angle of incidence θ2 increases as the point of incidence of the beam approaches the periphery of the lens LS.

In FIG. 6A, symbol B indicates a linearly polarized beam making incidence obliquely at an angle of 45°. The graph of FIG. 6C indicates that the polarization direction of such a beam changes, as explained more in detail, for example, in "Applied Physical Engineering" by Tsuruta (published by Baiyo-kan (Fifth Edition (1998) at pages 237–240). It is explained, in particular, that: "If linearly polarized light oscillating in the direction of 45° from the plane of incidence, there is no retardation in phase between transmissivity tp and ts of p-polarization and s-polarization and since tp>ts, the transmitted beam is also linearly polarized and its plane of oscillation approaches slightly the plane of incidence (θ<45°)."

Figure 7A:
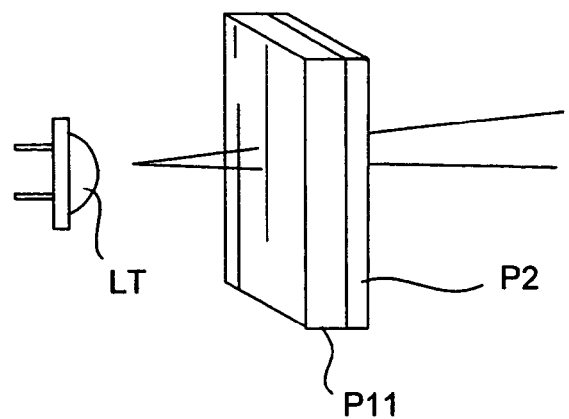
FIG. 7, consisting of FIGS. 7A, 7B and 7C, includes drawings for explaining the change in the direction of polarization of light by a ½ phase shifter.
Figure 7B:
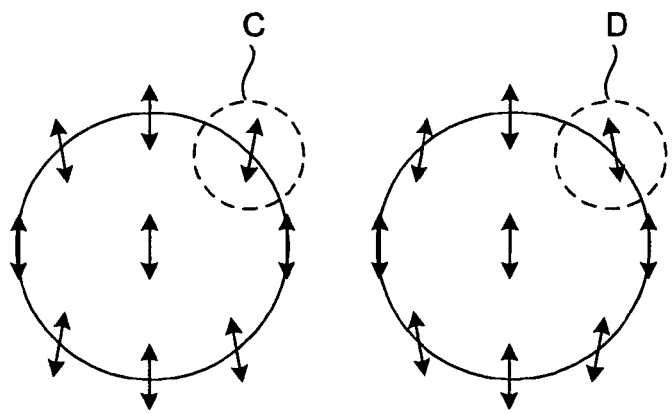
Figure 7C:
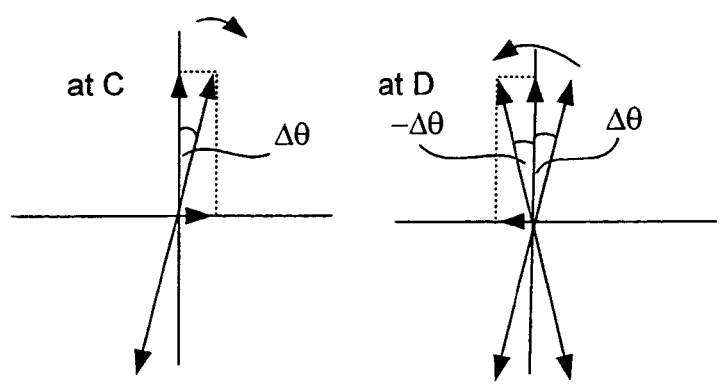

FIGS. 7A, 7B and 7C explain the effect of change in the direction of polarization by a ½ phase shifter. Let us consider a situation where a ½ phase shifter P2 is superposed on the output side of the first polarizer P11, as shown in FIG. 7A, to form a combination and light from the light-emitting element LT is passed therethrough from the side of the first polarizer to the ½ phase shifter P2. Then, as explained above with reference to FIG. 5B, light being outputted from the polarizer P11 has the direction of its linear polarization changed at positions in the directions of 1 o'clock and 30 minutes, 4 o'clock and 30 minutes, 7 o'clock and 30 minutes and 10 o'clock and 30 minutes. On the output side of the ½ phase shifter P2, however, there are changes in the opposite direction. In this situation, the change in the polarization direction by the oblique transmission of the polarizer P11 and that by the transmission of the ½ phase shifter P2 are related so as to reverse the polarity, as shown in FIG. 7C. For example, if the change in the polarization direction by passing through the polarizer P11 is +Δθ, the change after the passage through the ½ phase shifter P2 is −Δθ. This change is illustrated in FIG. 7B for other beams.

Figure 8A:
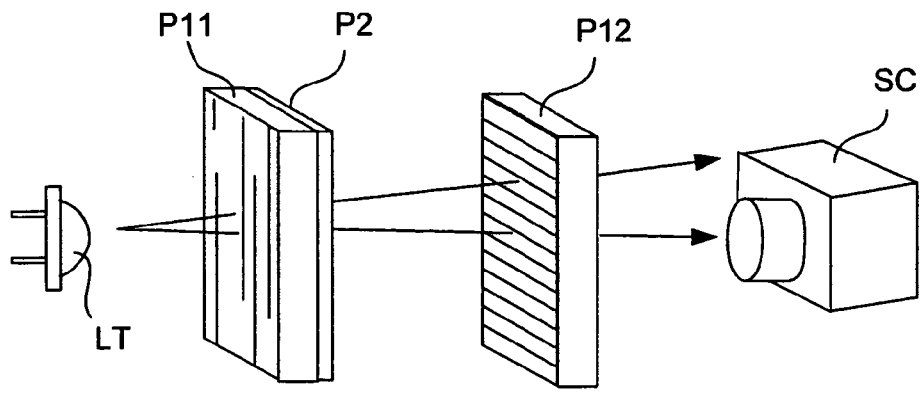
FIG. 8, consisting of FIGS. 8A, 8B, 8C and FIG. 9, consisting of FIGS. 9A and 9B, are drawings for explaining the change in the direction of polarization of light by a ½ phase shifter obtained by eliminating the effects of the lens.
Figure 8B:
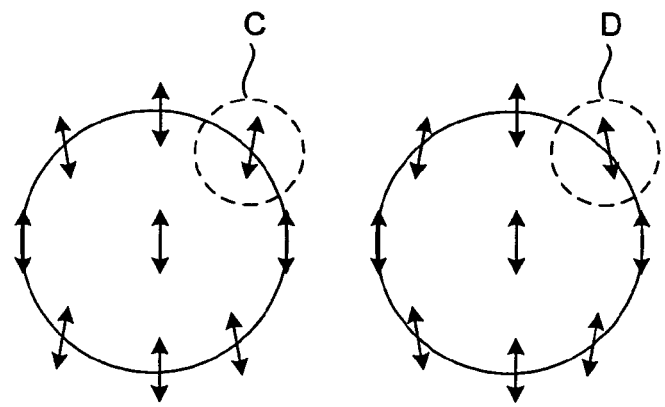

Next, FIGS. 8A, 8B, 8C, 9A and 9B are referenced to explain the experiment carried out by the present inventors regarding the change in the polarization direction by a ½ phase shifter, obtained by eliminating the effects of the lens. In this experiment, the light-emitting element LT and the stationary camera SC were set opposite each other and the first polarizer P11 and the second polarizer P12 were set in a cross-nicol relationship on the optical path between the light-emitting element LT and the stationary camera SC, as shown in FIG. 5A. The ½ phase shifter P2 was further placed on the output side of the first polarizer P11, as shown in FIG. 7A and altogether as shown in FIG. 8A. The directions of polarization observed at the output side of the polarizer P11 and the output side of the ½ phase shifter P2 are shown in FIG. 8B.

Figure 8C:
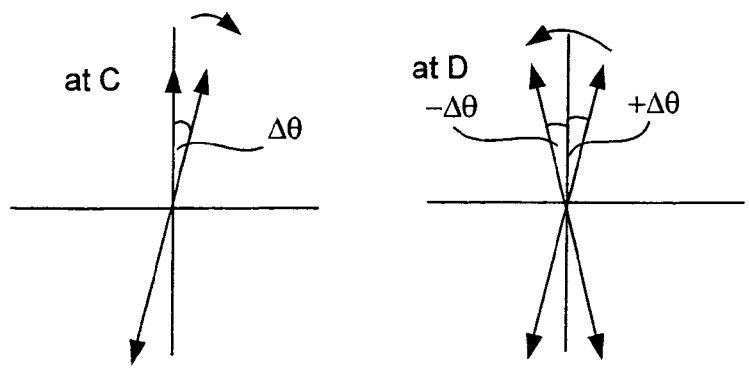
Figure 9A:
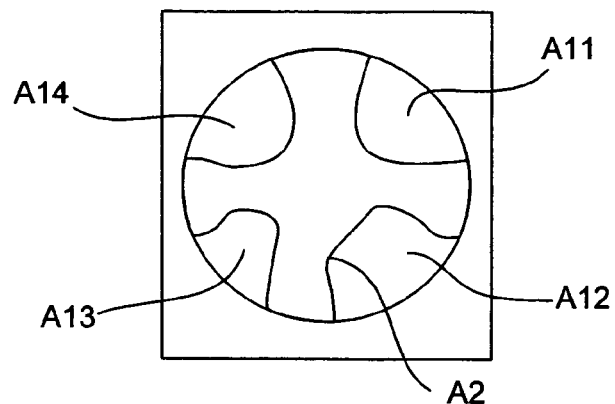

FIG. 8B shows that changes in the polarization direction are observed at positions in the directions of 1 o'clock and 30 minutes, 4 o'clock and 30 minutes, 7 o'clock and 30 minutes and 10 o'clock and 30 minutes according to the gate angle. As shown in FIG. 8C, if the change in the polarization direction due to the polarizer P11 is +Δθ, the change after the passage through the ½ phase shifter P2 is −Δθ. As a result, the image taken by the camera SC by the light after passing through the second polarizer P12 includes four areas A11, A12, A13 and A14 with light leakage, as shown in FIG. 9A. Symbol A2 indicates a screened area.

Figure 9B:
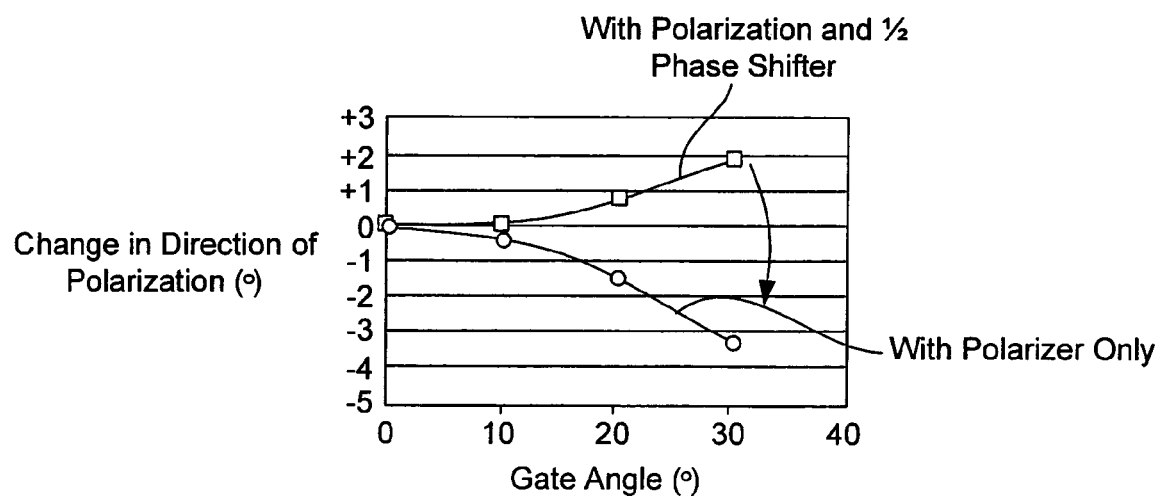

FIG. 9B is a graph for showing that the change in the polarization direction due to oblique incidence onto the polarizer is reversed in polarity by the ½ phase shifter. In summary, as shown by FIGS. 7A and 8A, the effect of the polarizer P11 on the polarization direction can be reversed by the ½ phase shifter P2 placed on the output side of the polarizer P11.

Figure 10A:
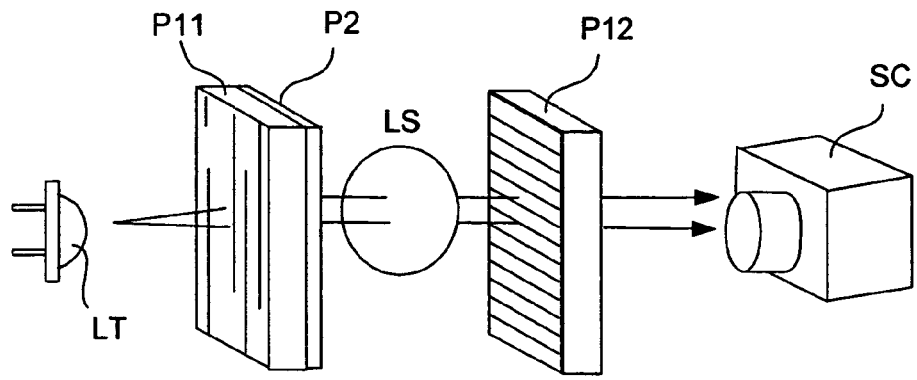
FIG. 10, consisting of FIGS. 10A, 10B, 10C and FIG. 11, consisting of FIGS. 11A and 11B, are drawings for explaining the total change in the direction of polarization of light by a polarizer, a ½ phase shifter and a lens.
Figure 10B:
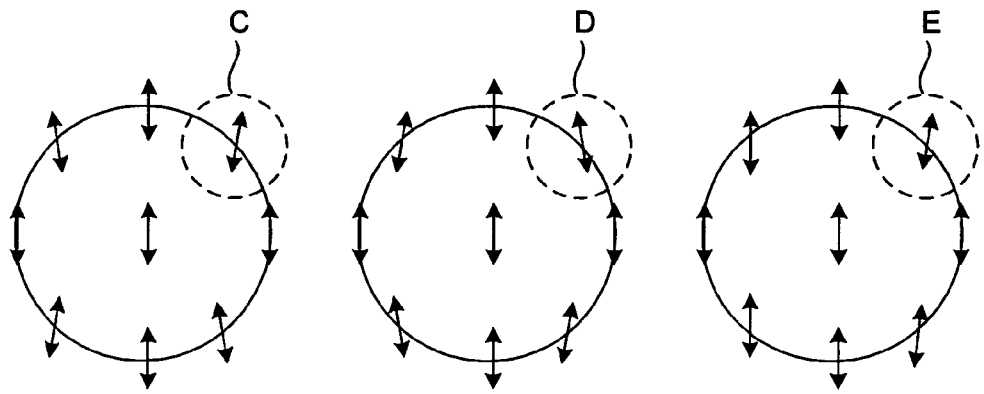
Figure 10C:
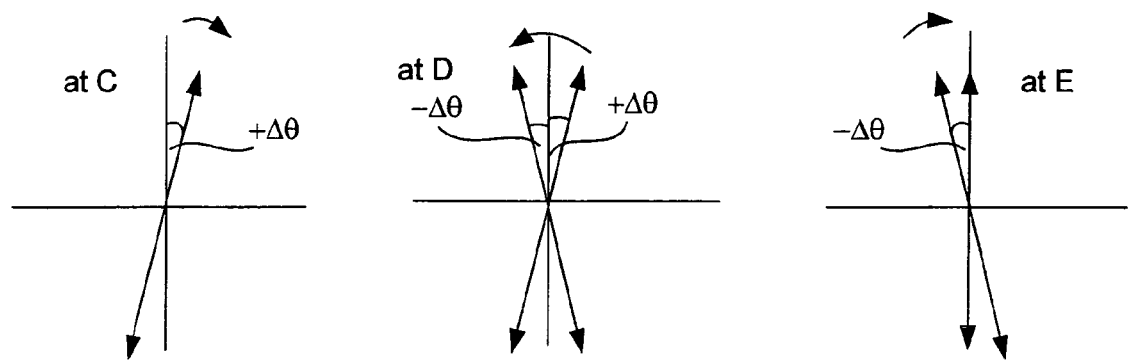

Next, FIGS. 10A, 10B, 10C, 11A and 11B are referenced to explain the combined effects of polarizers, a ½ phase shifter and a lens. As shown in FIG. 10A, the light-emitting element LT, the first polarizer P11, the ½ phase shifter P2, the lens LS, the second polarizer P12 and the stationary camera SC were arranged in this order and light emitted from the light-emitting element LT was passed sequentially through the first polarizer P11, the ½ phase shifter P2 and the lens LS to be made incidence on the second polarizer P12, and the output light from the second polarizer P12 was observed by the camera SC. As a result, as shown in FIGS. 10B and 10C, the polarization direction changes as the light passes through the polarizer P11 at the positions in the directions of 1 o'clock and 30 minutes, 4 o'clock and 30 minutes, 7 o'clock and 30 minutes and 10 o'clock and 30 minutes according to the gate angle. After the light passes through the ½ phase shifter P2, an inversion in polarity takes place on the change in the direction of polarization brought about by the oblique incidence onto the polarizer P11. As the light further passes through the lens LS, the polarization direction changes further, depending on the angle of incidence. Since the change in the polarization direction by the lens LS cancels out the change in the polarization direction brought about by the oblique incidence onto the ½ phase shifter P2, as shown in FIG. 10C, the image of the second polarizer P12 taken by the camera SC may be made entirely into the screened area A2 such that the leakage of light can be completely prevented.

Figure 11A:
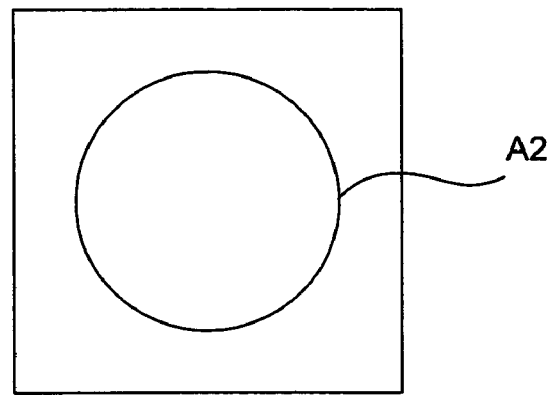
Figure 11B:
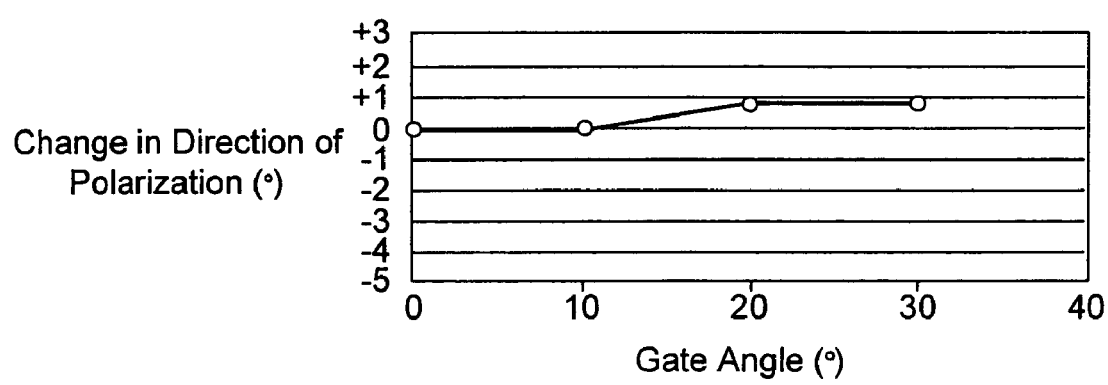

This means, as shown in FIG. 11B, that the change in the polarization direction can be made approximately constant, regardless of the increase in the gate angle. In other words, the change in the polarization direction shown in FIG. 5C brought about by the oblique incidence onto the polarizer can be inverted by means of the ½ phase shifter as shown in FIG. 9B and further cancelled by the change depending upon the angle of incidence to the lens as shown in FIG. 9C such that the nearly flat change characteristic as shown in FIG. 11B can be obtained finally. In this manner, the cross-nicol relationship between the first and second polarizers can be maintained nearly all over the area.

Although FIGS. 5–11 were referenced above to explain a situation where light passes through a polarizer, a ½ phase shifter and a lens, in this order, a similar result is obtained also where light passes through a lens, a ½ phase shifter and a polarizer, in this order. Thus, leakage of light can be reduced in a similar way also in the light-receiving optical system.

In summary, a retroreflective photoelectric sensor of this invention adopts an optical structure as characterized by FIG. 2 or 4 such that the leakage of light can be reduced as shown by FIG. 11 and hence that the presence and absence of a target object of detection can be clearly distinguished.

As explained above with reference to FIGS. 5–11 above, the basic principle of the invention is to appropriately balance the change in the polarization direction by the passage of light through a polarizer, the inversion of the polarization direction by the passage through a phase shifter and the change in the polarization direction by the passage through a lens such that they will cancel out. Thus, the phase shift to be effected by the phase shifter may be considered to be a matter of design. According to the studies by the present inventors, it is preferable that the phase shift to be effected by the phase shifter be in the range of ⅜–⅝ (with respect to the wavelength, that is, in units of $2\pi$) and more particularly preferable to be closer to ½. The optimum phase shift is believed to be obtainable from the relationship between the angles of incidence to the polarizer and the lens. According to the studies by the present inventors, the angle between the polarization axis of the polarizer and the optical axis of the phase shifter should preferably be less than about 5°.

FIG. 2 is referenced again to explain the invention more in detail.

The beam of light from the light-emitting element 11 passes through the first polarizer 12 and the ½ phase shifter 13 and then continues to propagate while increasing its sectional area such that it will be about the same as the effective surface area of the light-emitting lens 14. The center portion of the beam (along its optical axis) makes incidence to all of the first polarizer 12, the ½ phase shifter 13 and the light-emitting lens 14 and hence the direction of its (linear) polarization does not change. Since the optical axis of the ½ phase shifter is set parallel (or perpendicular) to the direction of polarization (polarizer axis) of the first polarizer 12, the center beam is under the same condition as if the ½ phase shifter were not present and the beam propagates to the light-emitting lens 14 with the direction of polarization unchanged. Since this center beam makes incidence onto the light-emitting lens 14 also perpendicularly, the beam passes through the center of the light-emitting lens 14 without changing the direction of its polarization.

Next, peripheral portions of the beam of light emitted from the light-emitting element 11 (which will pass peripheral points of the effective area of the light-emitting lens 14) will be considered. These portions of light do not make incidence perpendicularly onto the first polarizer 12 and the direction of polarization changes, depending of the angular position of the beam, as explained above with reference to FIG. 5B. Consider, for example, the portion propagating in the direction of 1 o'clock and 30 minutes with reference to FIG. 5B. The direction of polarization of this beam will not change as long as its gate angle is sufficiently small (say, less than 10°) but begins to change as the gate angle increases. When the gate angle is 30°, the direction of polarization changes by +1.8° C.

If the ½ phase shifter 13 were not present and the aforementioned peripheral portion of the beam were passed directly through the light-emitting lens 14, the direction of its polarization would further change in the positive direction, as explained above with reference to FIG. 6. If the light-emitting lens 14 is made of an acryl resin material, the change in the polarization direction will be as large as +4.0° if the angle of incidence is 68° (corresponding to the gate angle of 30°). The total change including the change by the first polarizer 12 would be 1.8°+4.0°=5.8°.

If the ½ phase shifter 13 is inserted between the first polarizer 12 and the light-emitting lens 14 according to the present invention, it functions to change the polarization direction in the opposite direction by the same angle by which the polarization direction was changed as the beam passed through the first polarizer 12, as explained above with reference to FIGS. 7 and 8. If the gate angle is 30°, the polarization direction should change from +1.8° to −1.8°. Experimentally, however, it was not −1.8° but −3.2°. It was probably because the ½ phase shifter was pasted onto the first polarizer 12 and there was an error in the arrangement of its optical axis.

Thereafter, the beam is passed through the light-emitting lens 14 and the polarization direction is changed again in the positive direction and the earlier obtained change in the negative direction is cancelled. If the angle of incidence onto the light-emitting lens 14 is 68°, the polarization direction changes by +4.0° and the total change becomes −3.3°+4.0°=+0.8°. This is much smaller than the total change of +5.8° in the polarization direction if the ½ phase shifter 13 were not inserted. Even if the polarization direction were −1.8° after the ½ phase shifter 13 is passed, the total change after the light passes through the light-transmitting lens 114 becomes −1.8°+4.0°=+2.2° and it is still much smaller than if the ½ phase shifter 13 were not inserted.

Next, FIG. 4 is referenced again to explain more in detail the relationship between the directions of the polarizer axes of the first and second polarizers 32 and 42.

Let us assume firstly that the direction of the polarizer axis of the first polarizer 32 is perpendicular (in the "perpendicular direction") to the plane defined by the light-emitting element 31, the light-receiving element 43 and the common lens 5 and that of the second polarizer 32 is horizontal. In this case, the light emitted from the light-emitting element 31 and passed through the first polarizer 32 is linearly polarized in the perpendicular direction except that the direction of polarization changes for beams propagating in the directions of 1 o'clock and 30 minutes, 4 o'clock and 30 minutes, 7 o'clock and 30 minutes and 10 o'clock and 30 minutes (or directions making 45° with the polarizer axis) if the gate angle becomes sufficiently large, as explained above. After this linearly polarized light passes through the ½ phase shifter 33, it makes incidence onto the beam splitter 6 as an s-polarized beam (that is, with its plane of polarization parallel to the surface of the beam splitter 6). Thus, a part of this incident beam is reflected by the beam splitter 6 according to the Brewster's law and only the portion of the light oscillating in the perpendicular direction (or the p-polarized beam) propagates towards the target area of detection (as emitted light L1 of FIG. 3).

If this light is reflected by the reflector 200 (as shown in FIG. 3A), the reflected light L2 is elliptically polarized, including both light oscillating in the perpendicular direction and light oscillating in the horizontal direction. Most of the light oscillating in the horizontal direction passes through the beam splitter 6 and is received by the light-receiving element 43 after it passes through the ½ phase shifter 41 and the second polarizer 42 with horizontal polarizer axis. In other words, a portion of the reflected light L2 is received by the light-receiving element 43.

If the emitted light L1 is reflected by a target object 300 as shown in FIG. 3B, the reflected light L3 includes only components that oscillate in the perpendicular direction because only light oscillating perpendicularly to the target object is made incidence to the target object. A portion of this reflected light is reflected again by the beam splitter 6 according to the Brewster's law but the remaining portion passes through the beam splitter 6. The portion that passes through the beam splitter 6 also passes through the ½ phase shifter 41 but cannot pass through the second polarizer 42 and hence is not received by the light-receiving element 43. In other words, reflected light L3 from the target object 300 is not received by the light-receiving element 43. Thus, the sensor can distinguish between reflected light from the reflector and reflected light from a target object. The beam splitter 6 may be a half mirror without any polarization characteristic or a polarizing beam splitter with a polarization characteristic.

Let us consider next the situation where the direction of the polarizer axis of the first polarizer 32 is horizontal and that of the second polarizer 32 is in the perpendicular direction. In this case, the light emitted from the light-emitting element 31 and passed through the first polarizer 32 is linearly polarized, oscillating in the horizontal direction. After this linearly polarized light passes through the ½ phase shifter 33, it makes incidence onto the beam splitter 6 as the p-polarized beam, that is, it has the plane of polarization perpendicular to the plane of the beam splitter 6. Thus, the incident beam passes through the beam splitter 6 according to the Brewster's law and hardly any light is propagated into the target area of detection. This means that the structure shown in FIG. 4 is preferable in the case of a retroreflective photoelectric sensor of the coaxial type. This should be kept in mind also where the positions of the light-emitting and light-receiving elements 31 and 43 are interchanged.

Figure 14:
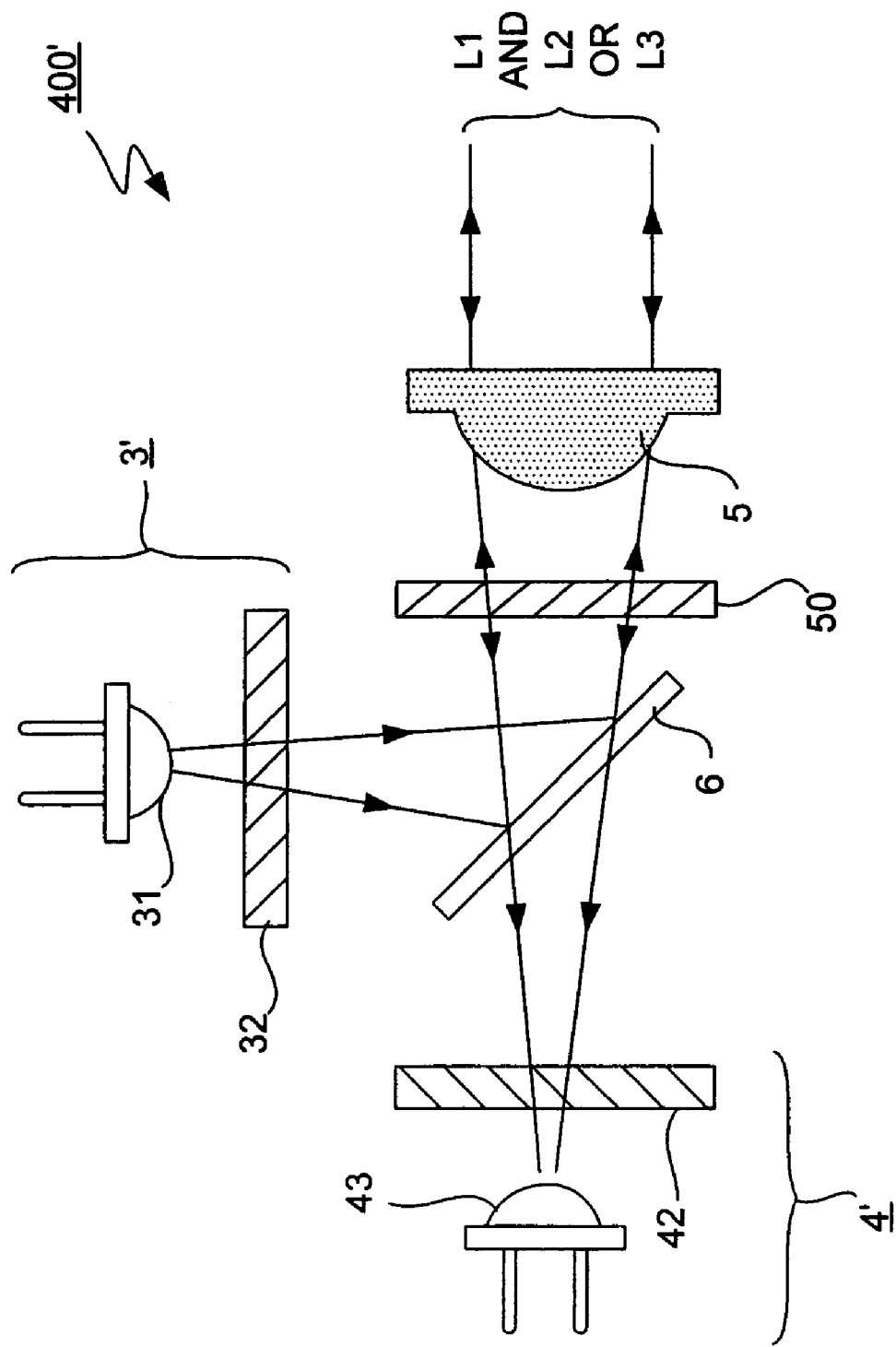
FIG. 14 is a structural diagram of the optical system of another retroreflective photoelectric sensor of a coaxial type embodying this invention.

Although FIG. 4 shows an embodiment wherein the ½ phase shifters 33 and 41 are intimately in contact respectively with the first and second polarizers 32 and 42, a single ½ phase shifter may be used to replace them, disposed between the beam splitter 6 and the common lens 5. FIG. 14 shows a retroreflective photoelectric sensor 400' thus structured according to such an alternative embodiment of this invention having a single ½ phase shifter 50 placed between the beam splitter 6 and the common lens 5. Its light-emitting and light-receiving optical systems 3' and 4' are different from those of the sensor 400 shown in FIG. 4 in that the phase shifters 33 and 41 are dispensed with. Thus, this embodiment is advantageous in that the number of components is reduced and its production cost is accordingly lower.

Figure 12A:
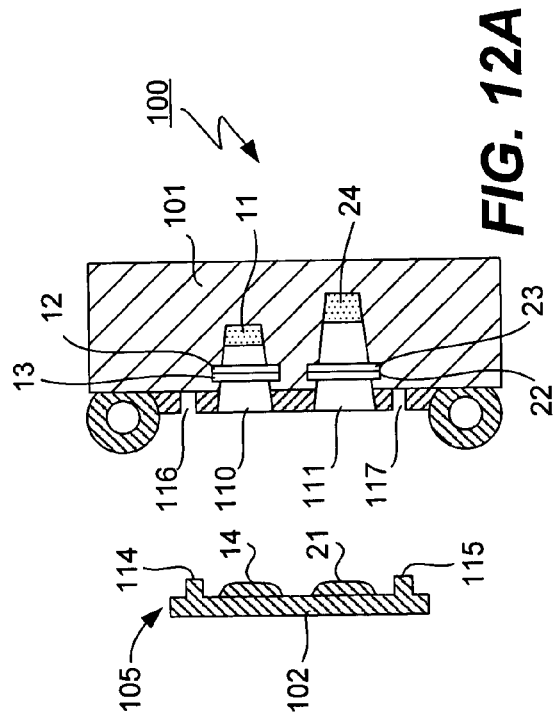
FIGS. 12A and 12B, together referred to as FIG. 12, are sectional views of the case of a retroreflective photoelectric sensor of the biaxial type embodying this invention.
Figure 12B:
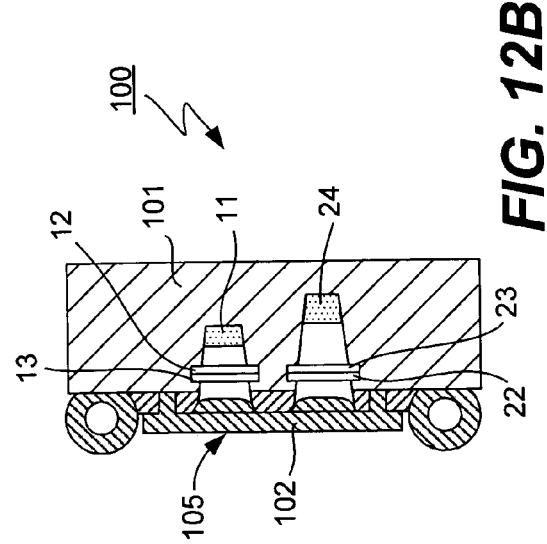

As shown in FIGS. 12A and 12B, the retroreflective photoelectric sensor 100 of the biaxial type embodying this invention may comprise a case 101, a lens unit 105 forming the light-emitting lens 14 and the light-receiving lens 21 in an integrated form together with a transparent cover 102, a linear polarizer sheet (as the first polarizer 12) on the light-emitting side and another linear polarizer sheet (as the second polarizer 13) on the light-receiving side. Symbols 13 and 22 each indicate a ½ wave sheet (serving as a ½ wave shifter).

The lens unit 105 is a molded product of an acryl resin material with retardation value of less than 17 nm/mm, produced by an extrusion molding process. The light-emitting lens 14 and the light-receiving lens 21 are arranged on the back surface of the planar transparent cover 102 where protrusions 114 and 115 are formed for engagement.

The case 101 is formed with conically shaped indentations 110 and 111 respectively for providing a space for receiving the light-emitting lens 14 and the light-receiving lens 21 of the lens unit 105.

The light-emitting element 11 serving as a light source, the linear polarizer 12 and the ½ phase shifter 13 are mounted inside the indentation 110, and the light-receiving element 24, the linear polarizer 23 and the ½ phase shifter 22 are mounted inside the indentation 111.

The lens unit 105 is attached to an attachment member in front of the case 101 by engaging the protrusions 114 and 115 with indentations 116 and 117 such that the light-emitting lens 14 and the light-receiving lens 21 are contained inside the indentations 110 and 111, respectively. The light-emitting element 11 is operated by a light-emitting circuit (not shown) and output signals from the light-receiving element 24 are inputted to a light-receiving circuit (not shown) such that the presence or absence of an object is determined, depending on the quantity of light received.

The quenching ratio of the lenses 14 and 21 is about ¹⁄₁₀₀₀ and their retardation value is less than 17 nm/mm. They are resin lenses produced by extrusion molding and cause only small deformations on the linear polarization of the transmitting light. The polarizers 12 and 23 are disposed respectively on the light-receiving side of the light-emitting lens 14 and the light-emitting side of the light-receiving lens 21 such that the light emitted from the light-emitting element 11 can be passed through the polarizer 12 to polarize it linearly and to be made incidence onto the light-emitting lens 14 and the reflected light from a reflector or a target object can be made incidence on the light-receiving lens 21 and passed through the polarizer 23 to linearly polarize it.

Since the lenses 14 and 21 are made of acryl resin and produced by extrusion molding, they can be formed integrally with the case 101 and hence a water-resistant and dust-resistant structure can be easily formed and the number of individual components to be produced can be reduced. This also serves to provide a compact photoelectric sensor.

Figure 13:
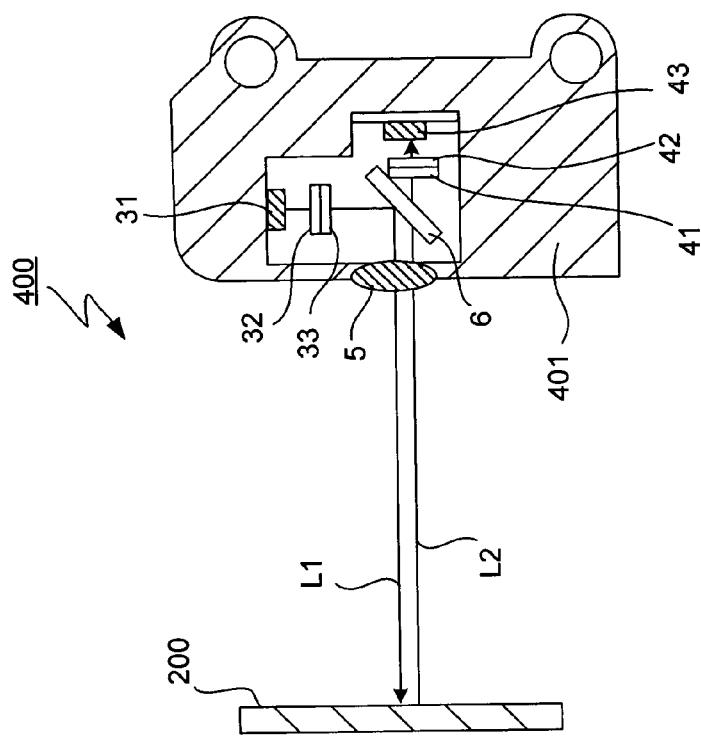
FIG. 13 is a sectional view of the case of a retroreflective photoelectric sensor of the coaxial type embodying this invention.

FIG. 13 is a sectional view of the photoelectric sensor 400 of the coaxial type. Symbols 401, 31, 32, 33, 41, 42, 43, 6 and 5 respectively indicate a case, the light-emitting element, the first polarizer, the first ½ phase shifter, the second ½ phase shifter, the light-receiving element, the beam splitter and the common lens.

With this sensor 400, too, the lens 5 is of an acryl material and is formed integrally with the case 401 and the optical system is of a coaxial type. Persons skilled in the art will easily understand the operations of this sensor without further explanations.

In summary, the present invention provides retroreflective photoelectric sensors that can be produced inexpensively and are capable of detecting a light-reflecting target object reliably.

What is claimed is:

1. A retroreflective photoelectric sensor comprising:
   a light-emitting optical system having a light-emitting element and a first polarizer and serving to transmit light from said light-emitting element through said first polarizer;
   a light-receiving optical system having a second polarizer and a light-receiving element and serving to convert light received through said second polarizer into an electrical signal by said light-receiving element;

a single lens for both emitting light from said light-emitting element and receiving light to said light-receiving element therethrough;

a beam splitter serving to direct light received from said light-emitting optical system to said single lens and light received from said single lens to said light-receiving optical system; and a phase shifter inserted between said light-emitting optical system and said single lens, wherein said first polarizer and said second polarizer have mutually perpendicular polarizer axes.

2. The retroreflective photoelectric sensor of claim 1 wherein said phase shifter is inserted between said first polarizer and said beam splitter.

3. The retroreflective photoelectric sensor of claim 2 further comprising another phase shifter inserted between said second polarizer and said beam splitter.

4. The retroreflective photoelectric sensor of claim 1 wherein said phase shifter and said another phase shifter each serve to shift the phase by $3/8$–$5/8$ with respect to the wavelength.

5. A retroreflective photoelectric sensor of claim 1 wherein said phase shifter is inserted between said beam splitter and said single lens.

6. A retroreflective photoelectric sensor comprising:

a light-emitting optical system having a light-emitting element and a first polarizer and serving to transmit light from said light-emitting element through said first polarizer;

a light-receiving optical system having a second polarizer and a light-receiving element and serving to convert light received through said second polarizer into an electrical signal by said light-receiving element, said first polarizer and said second polarizer having mutually perpendicular polarizer axes;

a single lens for both emitting light from said light-emitting element and receiving light to said light-receiving element therethrough;

a beam splitter serving to direct light received from said light-emitting optical system to said single lens and light received from said single lens to said light-receiving optical system; and means disposed between said first polarizer and said beam splitter for canceling the total rotation of the polarization plane that is the sum of rotations caused by passing through said first polarizer and said light-emitting lens.

* * * * *